United States Patent

[11] 3,572,876

| [72] | Inventor | Lowell A. Noble |
| | | Hillsborough, Calif. |
| [21] | Appl. No. | 402,022 |
| | | Division of Ser. No. 48,504, Aug. 9, 1960, |
| [22] | Filed | Oct. 6, 1964 |
| [45] | Patented | Mar. 30, 1971 |
| [73] | Assignee | Varian Associates |

[54] METHOD OF MAKING A NEUTRON SOURCE TUBE
3 Claims, 3 Drawing Figs.

[52] U.S. Cl..................................................... 316/20,
316/24
[51] Int. Cl..................................................... H01j 9/38
[50] Field of Search.......................................... 316/17, 25;
148/6.3; 117/200; 316/21; 316/20, 24

[56] References Cited
UNITED STATES PATENTS
| 2,721,108 | 10/1955 | Lewin............................ | 316/21 |
| 2,975,015 | 3/1961 | Davis............................ | 316/19 |

*Primary Examiner*—Richard A. Farley
*Assistant Examiner*—William T. Rifkin
*Attorney*—Robert W. Dilts ABSTRACT: A method of making a neutron source tube having active metal areas spaced apart on the envelope thereof, in which such active metal areas are heated or cooled in order to cause them to respectively sorb or not sorb an isotope of hydrogen during processing of the neutron source tube prior to the final sealing thereof.

INVENTOR.
LOWELL A. NOBLE

METHOD OF MAKING A NEUTRON SOURCE TUBE

Cross-reference is made to applicant's copending application Ser. No. 48,504, filed Aug. 9, 1960, in the name of Lowell A. Noble, for VACUUM TUBE AND METHOD OF MAKING IT; the instant application is a division thereof. This invention relates to vacuum tubes, particularly to tubes having vacuum-tight envelopes in which energized ions form nuclear reactions with matter.

In general, nuclear reactions are sometimes formed by high energy ions colliding with other ions or atoms. Neutrons, protons, new elements and isotopes, high energy gamma rays, etc. are the products of a nuclear reaction. For example, neutrons can be produced in a tube in which tritium atoms are ionized by a large DC pulse placed across the two terminals of a gas tube. One of the terminals having deuterium sorbed therein is biased negatively with respect to the other and forms the target for the tritium ions to strike and to combine with the deuterium therein.

In the process just described the time between when the electrostatic field is formed in the tube and the time when neutrons are produced is unpredictable because one relies on the probability of at least one free electron being accelerated by a suitable electrostatic field and forming collisions with gas molecules whereby more free electrons are produced and also ions. One can see that time lapse between when the DC pulse is placed across the electrodes and when neutrons are produced can vary from practically no time lag to several microseconds. This time will be referred to as the "jitter" time of the gas tube.

The Review of Scientific Instruments, Vol. 31, page 235, discloses a gas tube for a pulsed neutron source in which titanium films were evaporated onto the surface of a dielectric member, such as quartz and alumina, and were loaded with a hydrogen isotope. A spark is formed across the dielectric from one titanium film to another. This spark is regular, and the ion production repeats well on successive shots whereby the jitter time is reduced considerably and is about $10^{-8}$ seconds. This tube of the prior arc is expensive to make and cannot be produced in large quantities with any degree of quality control.

An object of this invention is to provide an improved structure for a pulsed neutron source.

Another object of this invention is to provide an economical structure for a pulsed neutron source.

Yet another object of this invention is to provide a rugged, ceramic structure for a pulsed neutron source.

Still another object of this invention is to reduce the processing and cleaning time of a pulsed neutron source.

A further object of this invention is to provide an improved structure for a pulsed neutron source whereby the production process is simplified.

A still further object of this invention is to provide an improved pulsed neutron source.

Broadly, this invention provides a spark source within a tube envelope where the a spark is formed along an inside surface of a dielectric which forms a part of the envelope wall so that the active metal which forms at least one of the spark terminals may be kept cool and nonactive during tube processing.

This invention contains other objects and features of advantage, some of which, with the foregoing, will be set forth in the following description of the invention.

This invention contains other objects and features of advantage, some of which, with the foregoing, will be set forth in the following description of the invention. The invention is understood to be not limited to the disclosed embodiments, as variant embodiments thereof are contemplated and may be adopted within the scope of the claims.

Referring to the drawing.

Figure 1:
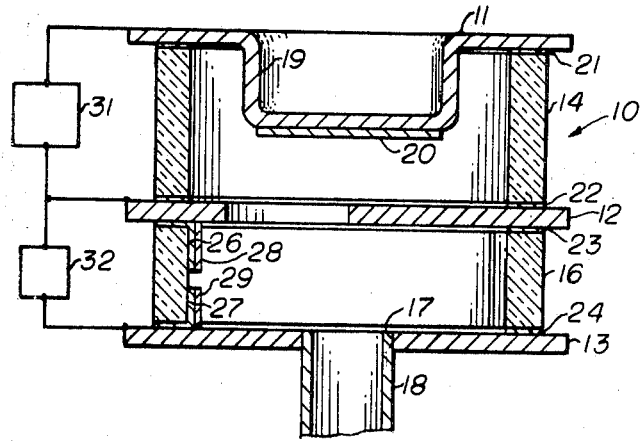
FIG. 1 is a cross section of a gas tube employing the invention.

Referring to the drawing in greater detail, FIG. 1 shows a tube 10 with three electrodes 11, 12, and 13 separated from each other by two ceramic rings 14 and 16. The three electrodes and the two ceramic rings form the envelope of the tube 10 with electrodes 11 and 13 forming the end walls of the envelope. Electrode 13 has an opening 17 to which an exhaust tubulation 18 is fixed; electrode 12 is ring-shaped with ceramic rings 14 and 16 bonded one to each side; and electrode 11 has a cup portion 19 which extends into the envelope to suitably shape the electrostatic field and has on its inside surface a target 20 made of an active metal such as titanium. The electrodes 11, 12, and 13 are preferably made of Kovar metal and brazed to the ends of the ceramic rings which have been metallized by a suitable molybdenum-manganese metallizing process to form metallizing layers 21, 22, and 24 between each electrode and an end of a ceramic ring respectively.

The invention relates to forming an arc across a surface of a dielectric which forms a part of the envelope wall. Therefore on the inside wall of the ceramic ring 16 two metallizing strips 26 and 27 are formed preferably using the molybdenum-manganese metallizing process. One or both of the metallizing strips 26 and 27 are coated or preferably electric plated with active metal strips 28 and 29 respectively. An active metal such as titanium is used for strips 28 and 29. The strip 26 contacts the electrode 12 and the strip 27 contacts the electrode 13 to form the required electrical contacts.

In order to make the tube 10 a pulsed neutron source, the tube must be first baked out for outgassing while a vacuum is maintained within the envelope. Since the active metals within the tube will getter gases at elevated temperatures the tube structure of the prior art required bakeout of the tube parts separately before assembly or required the bakeout temperature of the assembled tube to be low whereby titanium will not getter gases. Baking out the tube at a low temperature dictates that the bakeout time be increased. The tube structure of this invention allows one to bake out the tube at very high temperatures thereby reducing the bakeout time and still keep the active metal below reaction temperature. The active metal is deposited only on interior surfaces of members which form the envelope walls. Since these members are relatively thin, heat is rapidly conducted away from the active metal by applying a heat sink on the outside surface of the envelope wall which surface is opposite the active metal. The active metal is maintained below its critical temperature at which it getters gases. This critical temperature for titanium is 200° C.

During tube processing, a tube incorporating the teaching of this invention can be placed in a bakeout oven with suitable heat sinks disposed on the exterior surfaces of the envelope opposite the target 20 and strips 28 and 29. After the tube is baked out the target 20 is raised to bakeout temperature by removing the heat sink from the exterior surface of the cup-shape 19. Deuterium gas is supplied through tubulation 18 and the tube is cooled whereby the target 20 sorbs large quantities of deuterium. The tube is again baked out while a vacuum is maintained within the tube through the tubulation 18 and the heat sink is applied as before to the exterior portions of the envelope opposite the target and the heat sink is removed from the exterior surface of the dielectric 16 opposite strips 28 and 29. This drives off any deuterium which may be on strips 28 and 29 and the other envelope parts except the target. Tritium is now supplied into the tube and the tube cooled. Only the active metal strips 28 and 29 sorb the tritium this time while the target 20 sorbs none. The target 20 does not sorb the tritium because, as previously mentioned, the heat sink has been removed only from wall 16 and the cooling of target 20 prevents the target from reaching sorption temperature. The excess tritium is pumped out of the tube. The active metal may be kept cool and the body of the tube baked out. The tubulation 18 is nipped off leaving a vacuum within the envelope.

Neutrons are produced by the tube when a high potential difference in the order of a few hundred kilovolts is applied between electrodes 11 and 12 by a convenient power supply 31 which makes the target 20 negative with respect to electrode 12. Tritium ions are liberated from the strips 28 and 29 when a spark is formed across the ceramic from strip 28 and 29 by a low voltage source 32 of a few hundred volts potential difference. The opening in ring electrode 12 is small compared to the internal diameter of the ceramic 14 so that the spark across the strips 28 and 29 does not see the ceramic. This prevents any metal which is sputtering from the spark from depositing on the ceramic and shorting electrodes 11 and 12.

Figure 2:
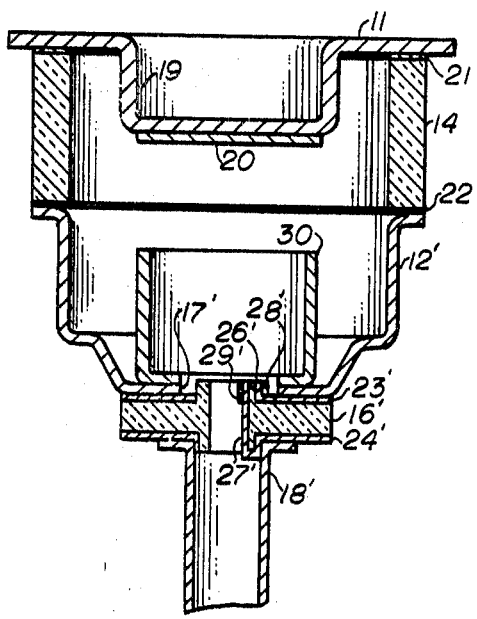
FIGS. 2 and 3 are different embodiments of the invention.
Figure 3:
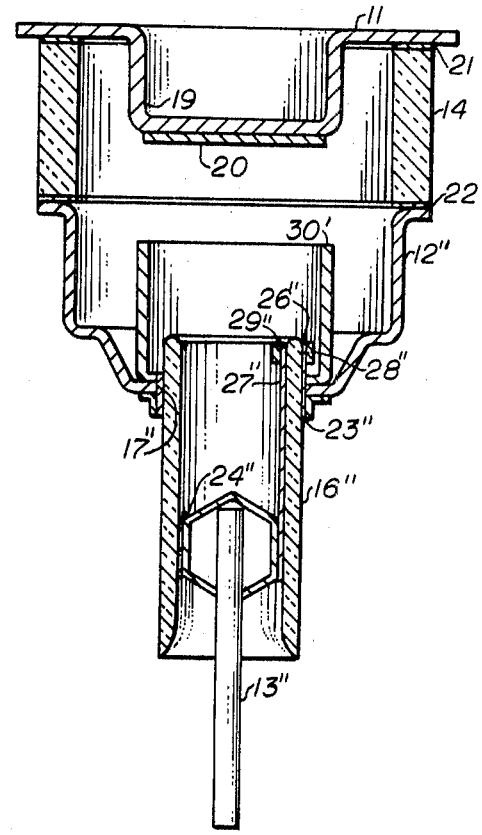

FIGS. 2 and 3 show alternate embodiments of the invention wherein like reference numbers are used to define parts which are the same as in FIG. 1. More specifically, FIG. 2 shows an electrode 12' which is cup-shaped and is bonded to one end of ceramic ring 14 opposite electrode 11. An aperture 17' is formed in the bottom of the cup of electrode 12' and a ceramic ring 16' in the shape of a button is bonded to the electrode 12'. A tubulation 18' is bonded to the other side of the button-shape ceramic ring 16'. The ceramic ring 16' has metallized active metal strips 28' and 29'. Strip 28' is connected to electrode 12' and strip 29' is connected to tubulation 18'. Tubulation 18' also acts as the other electrode and is similar to electrode 13 in FIG. 1.

FIG. 3 shows an electrode 12'' having an aperture 17'' to which a ceramic tube 16'' is bonded. Electrode 13'' is bonded within the ceramic tube 16''. Active metal metallizing strips 28'' and 29'' are formed on the ceramic 16'' with strip 28'' contacting electrode 12'' and strip 29'' contacting electrode 13''. The tubulation in this embodiment can be formed in another part of the envelope. For example, an exhaust tubulation can be brazed to member 11 on the annular flat surface between wall 19 and ceramic cylinder 14.

A suitable shield must be used with the embodiments shown in FIGS. 2 and 3 so that the insulator of these tubes will not have deposited thereon metal sputtering from the spark as described in FIG. 1. Thus, in FIG. 2 the ceramic wall 14 is shielded from the spark between 28', 29' by means of the cuplike shield member 30. In FIG. 3, a similar shield is designated 30'.

The ceramic in this invention is preferably a high grade alumina. The invention provides an improved structure for forming an arc across a ceramic whereby the active metals in the tube can be economically, rapidly, and easily processed. The various active metals structures in the tube each have sorbed therein only one of the hydrogen isotopes insuring that a tritium-deuterium reaction will occur when the tube is pulsed.

The spark formed across the surface of a ceramic member is also useful in a gas-filled tube to reduce the jitter time of the tube. The spark being regular will ionize the gas which fills the envelope. The ions are then attracted by the target.

I claim:

1. The method of making a neutron source tube of the type having an active metal target area and an active metal spark source area wherein said target and spark source are positioned in contact with the inner wall surface of the envelope of said tube and are positioned at substantially spaced positions along said envelope, said method comprising the steps of cooling one of said active metal areas, heating the other of said active metal areas, introducing one isotope of hydrogen into said tube, cooling said other of said active metal areas while maintaining said one hydrogen isotope in said tube, removing said one hydrogen isotope from said tube, heating said one of said active metal areas while keeping cool said other of said active metal areas, introducing another isotope of hydrogen into said tube and cooling said one of said active metal areas while maintaining said other hydrogen isotope in said tube.

2. The method claimed in claim 1 including subsequent steps of removing said other isotope of hydrogen from the tube, and sealing said tube.

3. The method of making a neutron source tube of the type having an active metal target area and an active metal spark source area wherein said target and spark source are positioned in contact with the inner wall surface of the envelope of said tube and are positioned at substantially spaced positions along said envelope, said method comprising the steps of cooling both of said active metal areas, heating the remainder of the tube to bake out the tube, heating one of said active metal areas while cooling the other to bake out the heated active metal area, introducing one isotope of hydrogen into the tube, cooling said one of said active metal areas while maintaining said one hydrogen isotope in said tube, removing said one hydrogen isotope from said tube, heating said other of said active metal areas while keeping cool said one of said active metal areas, introducing another isotope of hydrogen into said tube, cooling said other of said active metal areas while maintaining said other hydrogen isotope in said tube, removing said other hydrogen isotope from the tube, and sealing said tube.